(12) United States Patent
Aota et al.

(10) Patent No.: US 6,474,898 B1
(45) Date of Patent: Nov. 5, 2002

(54) COUPLING STRUCTURE BETWEEN SHAFT AND YOKE

(75) Inventors: Kenichi Aota, Shiki-gun (JP); Tae Kamikawa, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/557,177

(22) Filed: Apr. 21, 2000

(30) Foreign Application Priority Data

Apr. 27, 1999 (JP) .......................................... 11-119704

(51) Int. Cl.⁷ ................................ F16B 1/00; F16D 3/26
(52) U.S. Cl. ......................... 403/12; 403/290; 403/373
(58) Field of Search ........................... 403/12, 314, 290, 403/373

(56) References Cited

U.S. PATENT DOCUMENTS

| | | | | |
|---|---|---|---|---|
| 4,507,007 A | * | 3/1985 | Mallet | ........................ 403/157 |
| 5,358,350 A | * | 10/1994 | Oertie | ........................ 403/12 |
| 5,490,751 A |   | 2/1996 | Courgeon | .................... 411/368 |
| 6,155,739 A | * | 12/2000 | Sekine et al. | ................. 403/12 |

FOREIGN PATENT DOCUMENTS

| | | | | |
|---|---|---|---|---|
| FR | 2624083 A1 | * | 6/1989 | |
| JP | 5-280508 |   | 10/1993 | |
| JP | 8-326767 A | * | 12/1996 | |
| JP | 8-338440 A | * | 12/1996 | |
| JP | 2001-99178 A | * | 4/2001 | ............. F16D/3/26 |

* cited by examiner

Primary Examiner—Lynne H. Browne
Assistant Examiner—Ernesto Garcia
(74) Attorney, Agent, or Firm—Nixon & Vanderhye P.C.

(57) ABSTRACT

A shaft-and-yoke coupling structure includes a presser plate which covers outer surface of a U-shaped shaft insertion portion of a yoke and which has claws bent toward an inner surface of each end portion of the shaft insertion portion. The claws press the shaft inserted into the shaft insertion portion, and this pressing by the claws prevents the shaft from being axially decentered. Also, the shaft is temporarily secured to the yoke with the claws, a work for bolting the shaft is facilitated. Thus, the shaft-and-yoke coupling structure is superior in workability and capable of correct assembling shaft and yoke.

7 Claims, 5 Drawing Sheets

COUPLING STRUCTURE BETWEEN SHAFT AND YOKE

BACKGROUND OF THE INVENTION

1. Field of the Invention

The present invention relates to a shaft-and-yoke coupling structure to be applied to universal joints.

2. Discussion of Prior Art

The present invention relates to a shaft-and-yoke coupling structure to be applied to universal joints.

Conventionally, for example, among shaft-and-yoke coupling structures of steering joints, there has been provided one in which after a shaft is slid axially so as to be inserted into a yoke, a bolt radially inserted into the yoke is tightened so that the yoke and the shaft are coupled together.

Another shaft-and-yoke coupling structure is that, as shown in FIG. 7, a shaft 71 is slid radially into a yoke 72 perpendicularly to the axis so as to be inserted into the yoke 72.

However, in the latter coupling structure, a tightening bolt (not shown) is inserted into bolt holes 73, 75 of the yoke 72 after the shaft 71 is fitted into the yoke 72. Therefore, the worker has to hold the fitted state of the shaft 71 and the yoke 72 until this bolt is tightened up, which causes a disadvantage of poor workability.

There is also another disadvantage that the shaft 71 and the yoke 72 may be axially decentered or inclined each other before the bolt is tightened up.

SUMMARY OF THE INVENTION

Therefore, an object of the present invention is to provide a shaft-and-yoke coupling structure which is superior in workability and capable of correct assembling.

In order to achieve the above object, the invention provides a shaft-and-yoke coupling structure comprising: a yoke having a shaft insertion portion which is cross-sectionally U-shaped and end portions of which have bolt receiving portions for a bolt to be inserted; a shaft to be inserted into the shaft insertion portion; an elastic presser plate covering an outer surface of the shaft insertion portion and having at least one claw bent toward an inner surface of the shaft insertion portion, wherein the shaft inserted into the shaft insertion portion is restricted by the claw.

According to this invention, since the claws of the presser plate restrict the shaft inserted into the shaft insertion portion, the shaft can be temporarily secured to the yoke by the presser plate, making it easier for the worker to perform the bolting work. Therefore, according to this invention, it is possible to obtain a shaft-and-yoke coupling structure which is superior in workability and capable of correct assembling.

In an embodiment of the invention, the presser plate is formed in such a way that a wedge-shaped gap is formed between the presser plate and the outer surface of the shaft insertion portion so that, by fastening the presser plate with the bolt inserted into the bolt receiving portion, the presser plate is inwardly flexed to press the shaft with the claw.

According to this embodiment, since the claws of the presser plate press the shaft by making use of a force of tightening the presser plate with the bolt, the shaft and the yoke can be prevented from being axially decentered. Also, after the bolt tightening, the shaft can be securely fixed to the yoke by the claws of the presser plate. Therefore, even if any prying force occurs after the bolt tightening, the shaft and the yoke can be prevented from being axially decentered.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in detail by way of embodiments thereof illustrated in the accompanying drawings.

Figure 3:
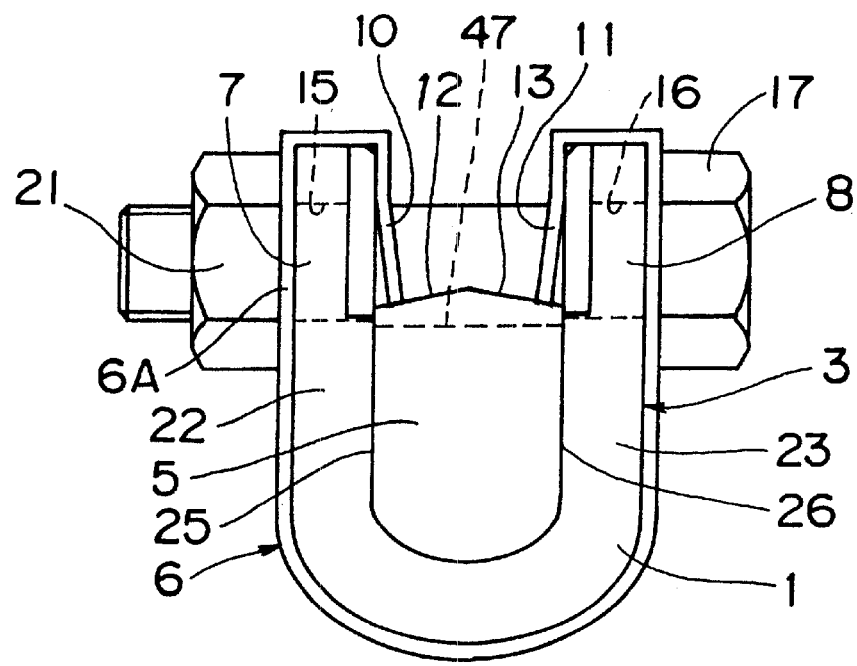
FIG. 3 is a view showing a state in which the shaft is inserted to a specified position of the yoke with a bolt completely tightened in the embodiment of FIG. 1.

FIG. 3 shows an embodiment of a shaft-and-yoke coupling structure of the present invention. In this embodiment, the shaft-and-yoke coupling structure includes a yoke 3, a shaft 5 and a presser plate 6. The yoke 3 has a shaft insertion portion 1 and the shaft insertion portion 1 has bolt receiving portions 15, 16. The shaft insertion portion 1 is opened on one side of its radial direction to be substantially U-shaped in cross section. The shaft 5 is inserted into the shaft insertion portion 1. The presser plate 6 covers the outer surface of the shaft insertion portion 1.

The presser plate 6 made of spring steel has claws 10, 11 which are bent toward inner surfaces of end portions 7, 8 of the shaft insertion portion 1. These claws 10, 11 press upper taper surfaces 12, 13 of the shaft 5 downwardly from above as shown in FIG. 3. In the presser plate 6, a nut 21 is fixed to a side plate 6A, and a bolt 17 inserted through bolt receiving portions 15, 16 formed at the end portions 7, 8 of the shaft insertion portion 1 is screwed and tightened to the nut 21. By this tightening, intermediate portions 22, 23 of the shaft insertion portion 1 tighten both side faces 25, 26 of the shaft 5, while the claws 10, 11 of the presser plate 6 press the upper taper surfaces 12, 13 of the shaft 5 downwardly from above.

Figure 4:
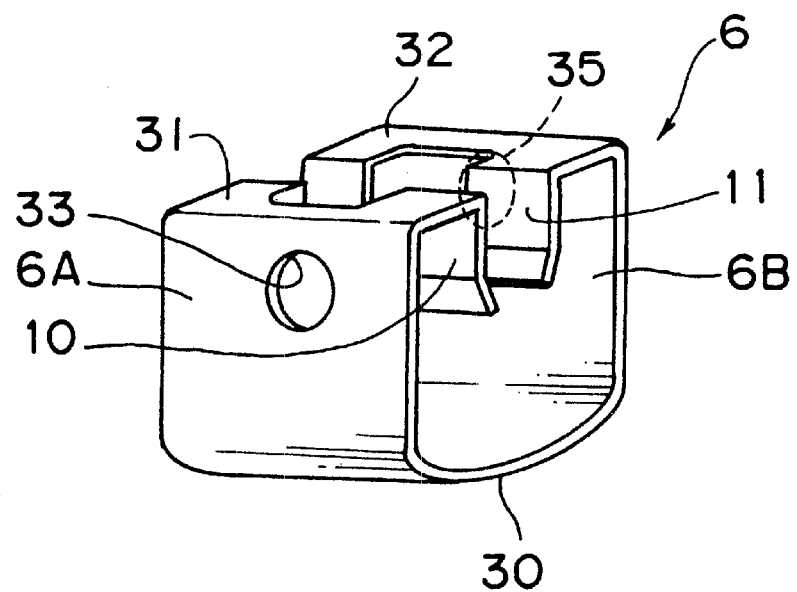
FIG. 4 is a perspective view showing a structure of the presser plate in the embodiment of FIG. 1.

The presser plate 6, as shown in FIG. 4, is substantially U-shaped as a whole and made up of a U-bent peripheral wall 30, top walls 31, 32 bent inward, and claws 10, 11 bent downward from the top walls 31, 32. Bolt holes 33, 35 are formed in side plates 6A, 6B of the U-bent peripheral wall 30, respectively. Also, the top walls 31, 32 are cut out at their centers in substantially rectangular shape so as to divide each of the claws 10, 11 into two.

Figure 1:
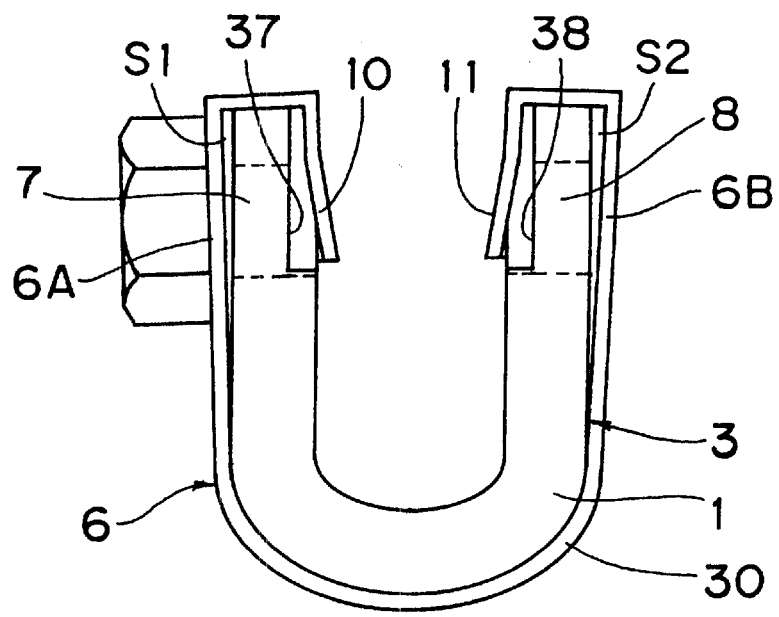
FIG. 1 is a view showing a yoke and a presser plate in an embodiment of a shaft-and-yoke coupling structure according to the present invention.
Figure 2:
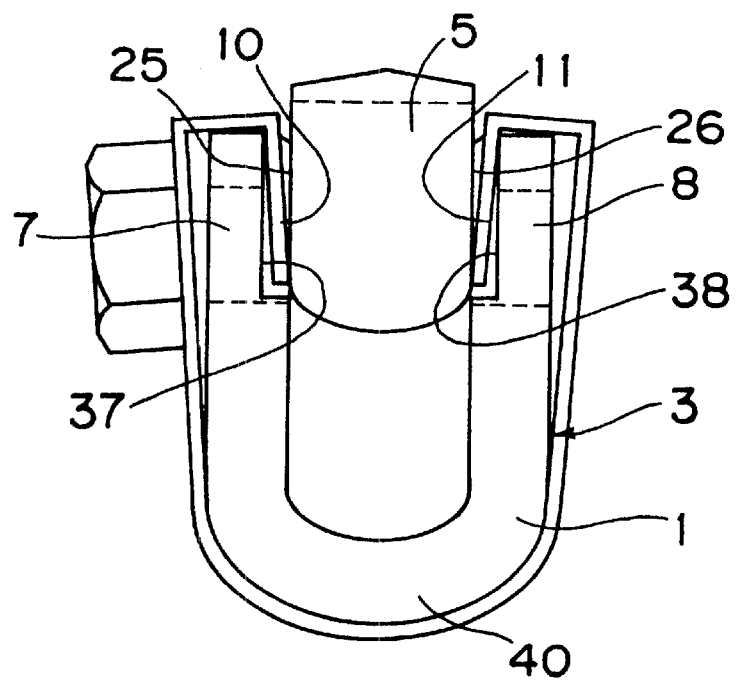
FIG. 2 is a view showing a state in which a shaft is inserted halfway into the yoke in the embodiment of FIG. 1.
Figure 6A:
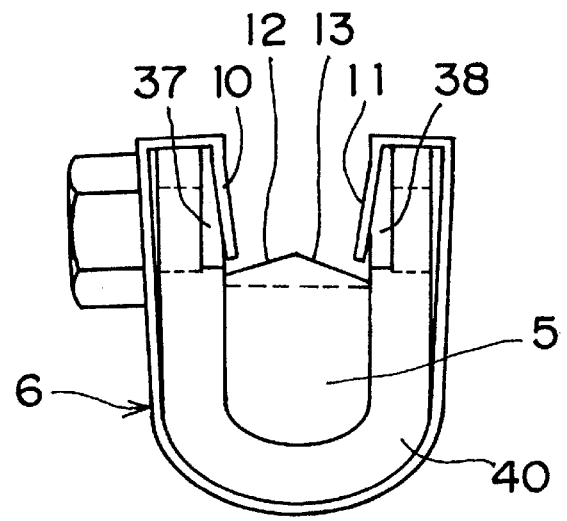
FIG. 6A is a view showing a state in which the shaft is inserted to the bottom of the yoke in the embodiment of FIG. 1.

Before the shaft 5 is inserted into the yoke 3, as shown in FIG. 1, the U-bent peripheral wall 30 of the presser plate 6 is slightly opened, so that specified wedge-shaped gaps S1, S2 are present between the side plates 6A, 6B and the end portions 7, 8 of the shaft insertion portion 1, respectively. The claws 10, 11 of the presser plate 6 projects inwardly from rectangular recessed portions 37, 38 formed in the inner surface of the end portions 7, 8 of the shaft insertion portion 1. Next, as shown in FIG. 2, when the shaft 5 is inserted between the end portions 7 and 8 of the shaft insertion portion 1 of the yoke 3, the claws 10, 11 of the presser plate 6 are pushed by flat side faces 25, 26 of the shaft 5, thereby flexed, so as to be accommodated in the rectangular recessed portions 37, 38 of the yoke 3, respectively. Then as the shaft 5 is further pushed in to a bottom portion 40 of the yoke 3, fore ends of the claws 10, 11 of the presser plate 6 are projected out from the rectangular recessed portions 37, 38 so as to be opposed to the upper taper surfaces 12, 13 of the shaft 5, thereby restricting the shaft 5 from above as shown in FIG. 6A. As a result, the shaft 5 has been temporarily secured to the yoke 3 prior to the bolt tightening, thus facilitating the subsequent bolt tightening work.

Further, as shown in FIG. 3, the bolt 17 is inserted through the bolt holes 15, 16 formed at the end portions 7, 8 of the shaft insertion portion 1 of the yoke 3, and then the bolt 17 is screwed to the nut 21 secured to the presser plate 6. As a result, the shaft 5 is tightened at the intermediate portions 22, 23 of the yoke 3, and concurrently the upper taper surfaces 12, 13 of the shaft 5 are strongly pressed by the fore ends of the claws 10, 11 of the presser plate 6, so that the shaft 5 can be prevented completely from axially decentering.

Also, by the bolt 17 being engaged with a radial recess 47 formed in the shaft S, the shaft 5 is inhibited from axially moving, so that the shaft 5 can be prevented from any axial shifts.

Figure 5A:
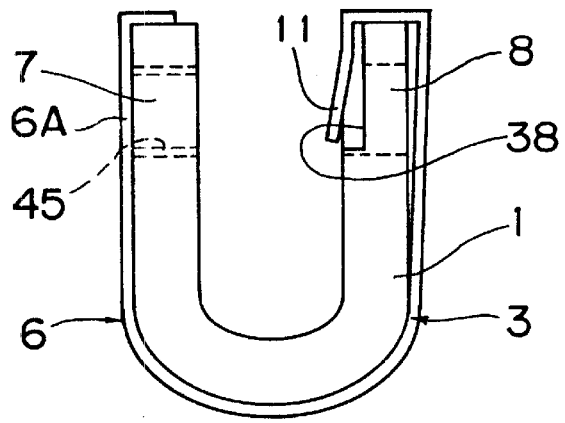
FIG. 5A is a view showing a yoke and a presser plate in a modification of the embodiment of FIG. 1.
Figure 5B:
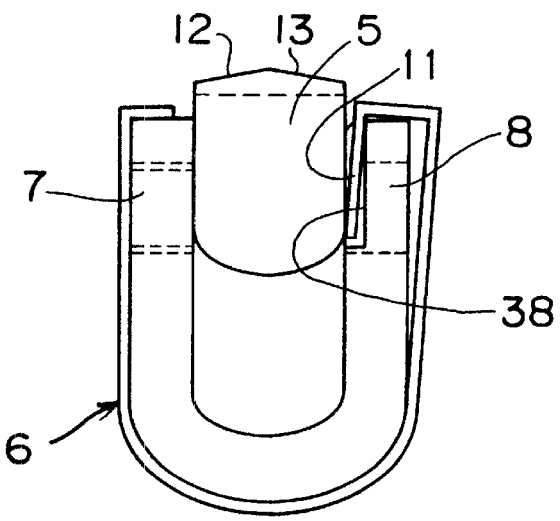
FIG. 5B is a view showing a state in which the shaft is inserted halfway of the yoke in the modification of FIG. 5A.
Figure 5C:
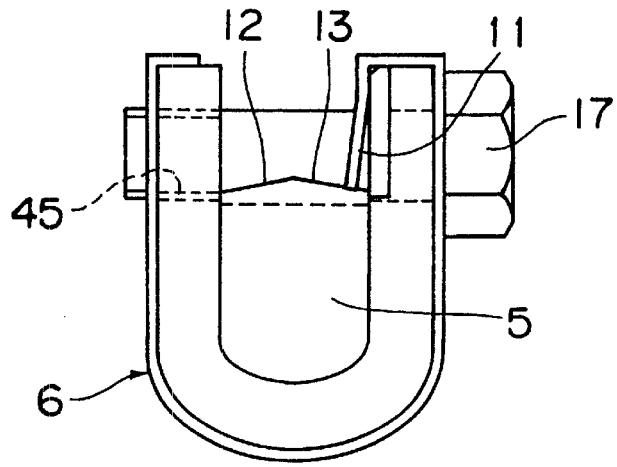
FIG. 5C is a view showing a state in which the shaft is inserted to a specified position of the yoke with the bolt completely tightened in the modification of FIG. 5A.

Although the presser plate 6 has a pair of claws 10, 11 in this embodiment, it is also possible for the presser plate 6 to have only a one-sided claw 11 as shown in FIG. 5A. Also as shown in FIG. 5A, without the nut 21 secured to the side plate 6A of the presser plate 6, a screw hole 45 may be formed in place of the bolt hole 15 at the end portion 7 of the shaft insertion portion 1 of the yoke 3. In this case, since the nut 21 is eliminated and the rectangular recessed portion 37 on one side of the yoke 3 is no longer needed as shown in FIG. 5B, the shaft-and-yoke coupling structure becomes simpler.

Figure 6B:
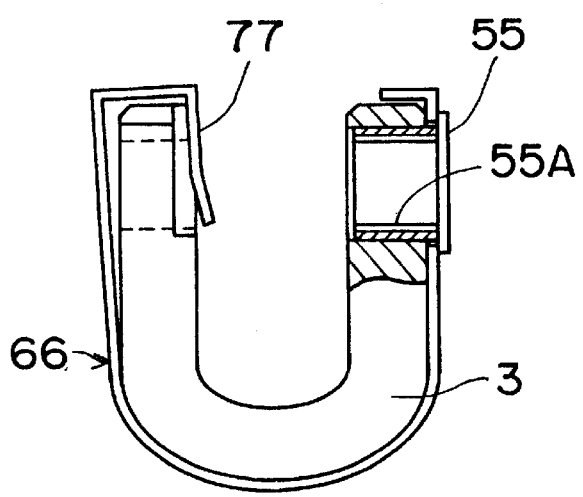
FIG. 6B is a partial sectional view showing a modification similar to the modification shown in FIG. 5A.
Figure 6C:
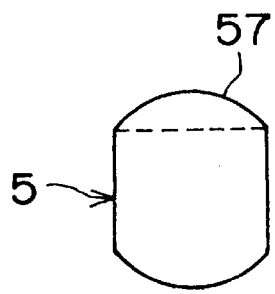
FIG. 6C is a view showing a modification of the shaft used in the foregoing embodiment and modification.
Figure 7:
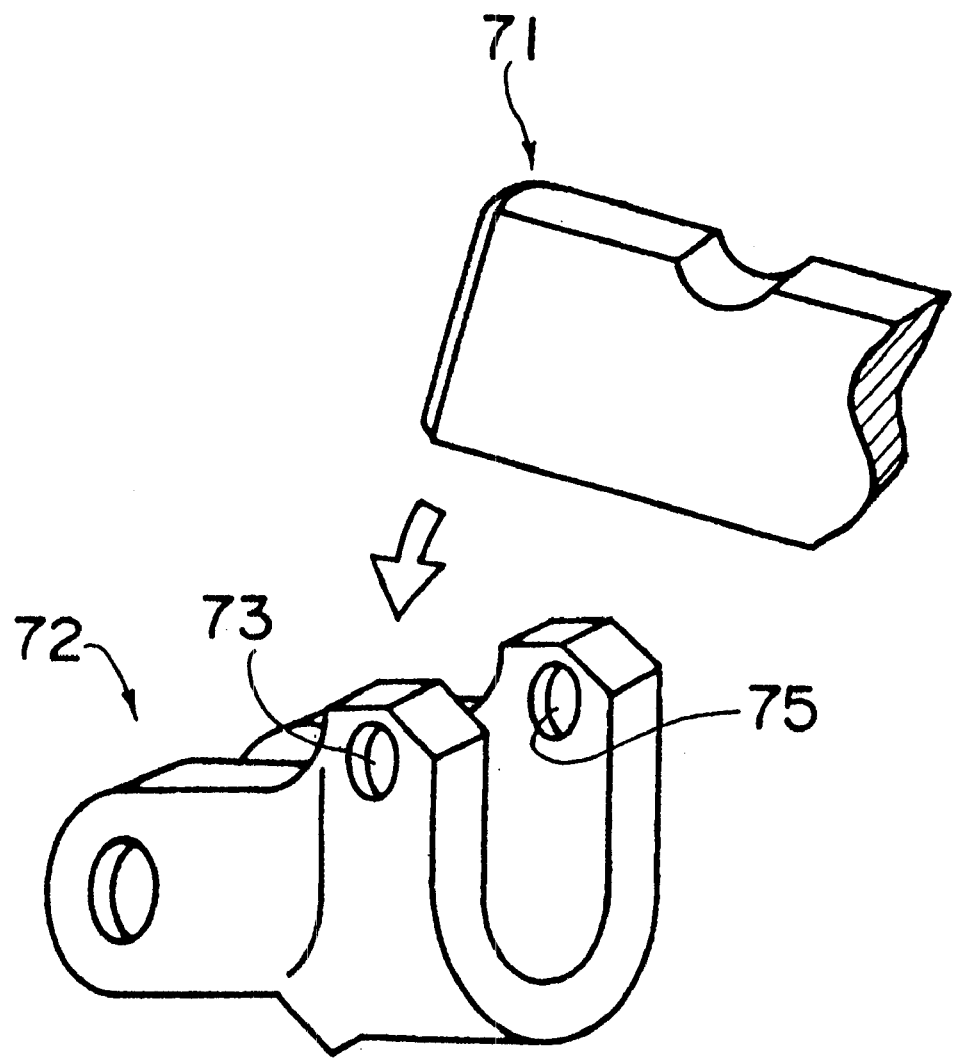
FIG. 7 is a perspective view for showing a shaft-and-yoke coupling structure according to the prior art.

Also, as shown in FIG. 6B, in a plate 66 having a claw 77 only on one side, a bushing 55 having a screw hole 55A formed radially inward may be press-fitted and secured into the yoke 3 together with the plate 66, instead of the screw hole 45 shown in FIG. 5A. In this case, since the plate 66 is secured to the yoke 3, the claw 77 can exhibit more reliable operation at the time when the shaft 5 is inserted. Further, as shown in FIG. 6C, a curved surface 57 instead of the upper taper surfaces 12, 13 may be provided for the upper surface of the shaft 5.

The invention being thus described, it will be obvious that the same may be varied in many ways. Such variations are not be regarded as a departure from the spirit and scope of the invention, and all such modifications as would be obvious to one skilled in the art are intended to be included within the scope of the following claims.

What is claimed is:

1. A shaft-and-yoke coupling structure comprising:

a yoke having a shaft insertion portion which is cross-sectionally U-shaped, said yoke having two end portions each end portion has a bolt receiving portion through which a bolt is insertable;

a shaft to be inserted into the shaft insertion portion;

an elastic presser plate covering an outer surface of the shaft insertion portion and having at least one claw bent toward an inner surface of the shaft insertion portion, the presser plate forms a wedge-shaped gap between the presser plate and the outer surface of the shaft insertion portion so that by fastening the presser plate with the bolt when inserted into the bolt receiving portion, the presser plate is inwardly flexed to press the shaft with said at least one claw wherein the shaft inserted into the shaft insertion portion is restricted by the claw, wherein a rectangular recessed portion, capable of entirely accommodating at least one claw, is formed in the inner surface of at least one of said two end portions of the shaft insertion portion, and a fore end of the claw is inwardly projected out from the rectangular recessed portion.

2. A shaft-and-yoke coupling structure comprising:

a yoke having a shaft insertion portion which is cross-sectionally U-shaped, said yoke having two end portions each end portion has a bolt receiving portion through which a bolt is insertable;

a shaft to be inserted into the shaft insertion portion, an elastic presser plate covering an outer surface of the shaft insertion portion and having at least one claw bent toward an inner surface of the shaft insertion portion, wherein the shaft inserted into the shaft insertion portion is restricted by the claw, wherein a rectangular recessed portion, capable of entirely accommodating at least one claw, is formed in the inner surface of at least one of said two end portions of the shaft insertion portion, and a fore end of the claw is inwardly projected out from the rectangular recessed portion.

3. The shaft-and-yoke coupling structure according to claim 1, wherein a nut for fastening the presser plate with the bolt is fixed to the presser plate.

4. The shaft-and-yoke coupling structure according to claim 1, wherein a female thread for engaging with the bolt is formed in one of the bolt receiving portions.

5. The shaft-and-yoke coupling structure according to claim 1, wherein a female-treaded bushing for engaging with the bolt is fitted into one of said bolt receiving portions of said yoke and secured to the presser plate.

6. The shaft-and-yoke coupling structure according to claim 1, wherein the shaft has a taper surface to be engaged with the claw.

7. The shaft-and-yoke coupling structure according to claim 1, wherein the shaft has a curved surface to be engaged with the claw.

* * * * *